(12) United States Patent
Clade et al.

(10) Patent No.: US 8,759,718 B2
(45) Date of Patent: Jun. 24, 2014

(54) ELECTRICAL HEATING DEVICE, IN PARTICULAR, A MOTOR VEHICLE AUXILIARY HEATING DEVICE AND A MOTOR VEHICLE AIR CONDITIONING DEVICE

(75) Inventors: Michael Clade, Lambsheim (DE); Franz Bohlender, Kandel (DE)

(73) Assignee: Eberspacher Catem GmbH & Co. KG, Herxheim (DE)

( * ) Notice: Subject to any disclaimer, the term of this patent is extended or adjusted under 35 U.S.C. 154(b) by 359 days.

(21) Appl. No.: 13/184,674

(22) Filed: Jul. 18, 2011

(65) Prior Publication Data

US 2012/0012573 A1 Jan. 19, 2012

(30) Foreign Application Priority Data

Jul. 16, 2010 (EP) .................... 10007394

(51) Int. Cl.
*B60L 1/02* (2006.01)
*H05B 3/78* (2006.01)

(52) U.S. Cl.
USPC ............ 219/208; 219/200; 219/505; 392/491

(58) Field of Classification Search
USPC ................ 219/200–208, 505, 536, 520, 548; 392/491, 347, 422–3
See application file for complete search history.

(56) References Cited

U.S. PATENT DOCUMENTS 4,616,693 A 10/1986 Dietzsch et al.
5,057,672 A 10/1991 Bohlender et al.

FOREIGN PATENT DOCUMENTS

| DE | 10 2005 029 774 A1 | | 6/2005 |
| DE | 10 2007 008 884 A1 | | 2/2007 |
| DE | 10200700884 | * | 9/2008 |
| FR | 2 849 806 A1 | | 1/2003 |
| WO | 03/008216 A1 | | 1/2003 |

OTHER PUBLICATIONS

European Search Report Dated Nov. 4, 2010 for European Patent Application Serial No. EP 10 00 7394.
Von Roland Burk, Hans-Joachim Kraub, and Michael Lohle, Integrales Klimasystem fur Elektroautomobile, Automobiltechnisch Zeitschrift 94 (1992), pp. 582-588.

* cited by examiner

*Primary Examiner* — Shawntina Fuqua
(74) *Attorney, Agent, or Firm* — Boyle Fredrickson, S.C.

(57) ABSTRACT

An electrical motor-vehicle auxiliary heating device is held in a housing forming oppositely situated air passage areas with formed air passage apertures. A flow resistance element protrudes beyond the outer side of the housing, is manufactured as a component independent of the housing, and is connected to it. The invention also relates to a motor-vehicle air conditioning device with an air conditioning housing which accommodates a motor-vehicle auxiliary heating system and which forms at least one flow channel, which leads to the motor-vehicle auxiliary heating and forms an insertion opening for the motor-vehicle auxiliary heating as well as a boundary wall situated opposite the insertion opening. At least one flow resistance element is provided that is manufactured as a component independent of the housing and the air conditioning housing and that bridges a clearance distance between the housing and the wall(s) of the air conditioning housing.

17 Claims, 7 Drawing Sheets

ELECTRICAL HEATING DEVICE, IN PARTICULAR, A MOTOR VEHICLE AUXILIARY HEATING DEVICE AND A MOTOR VEHICLE AIR CONDITIONING DEVICE

BACKGROUND OF THE INVENTION

1. Field of the Invention

The present invention relates to an electrical heating device, in particular to an electrical heating device as auxiliary heater for a motor vehicle and is based on an electrical heating device comprising a housing, which forms oppositely situated air passage areas on each of which at least one air passage aperture is formed. The housing incorporates a heating block. This heating block comprises at least one PTC heating element and at least one radiator element which abuts it.

2. Description of the Related Art

A generic electrical heating device is for example known from EP 0 350 528. With this state of the art the PTC heating elements consist of one, preferably a plurality of PTC elements in one level on the oppositely situated sides of which sheet metal bands abut, of which some are extended sidewards beyond the heating block to form electrical connecting elements. These electrical connecting elements are normally exposed on the outer side of the housing. Meander-type, curved sheet metal strips are frequently used as radiator elements.

Electrical heating devices of this nature nowadays are normally used in air conditioning devices. These air conditioning devices have an air conditioning housing enclosing a heat exchanger, which can be connected to a cooling water circuit of a motor vehicle. The air conditioning housing also accommodates the motor-vehicle auxiliary heater to heat air normally flowing through the air conditioning housing when the internal combustion engine is relatively cold. In this respect the air conditioning housing has an insertion opening for the motor-vehicle additional heating device on the outer side of the air conditioning housing. Situated opposite to this insertion opening is a boundary wall formed by the air conditioning housing and which normally forms mounting apertures which accommodate mounting pins which are provided protruding beyond this outer surface on that outer surface of the housing of the motor-vehicle auxiliary heating which is adjacent to the boundary wall when the motor-vehicle heating device is installed.

An air conditioning housing is described generally in DE 33 31 890 C2. An appropriate housing with motor-vehicle additional heating is disclosed in the article "Integrales Klimasystem für Elektroautomobile" [Integral air conditioning system for electric cars], ATZ—Automobiltechnische Zeitschrift, November 1992 by Burk, Krauss, Dr. Löhle.

SUMMARY OF THE INVENTION

The object of the present invention is to improve the economic manufacture of electrical heating devices and their installation in the air conditioning housing. A flow resistance element is provided on the outer side of the housing as a component which is independent of the housing and is connected to it. The flow resistance element is located, preferably, in an extension of the air passage areas so that due to the flow resistance element the surface causing the flow resistance at the level of the electrical heating device in an air conditioning housing is enlarged. From the present invention, it can be derived that a flow channel guiding the air flow to the electrical heating device at the level of the electrical heating device is larger than the size of the housing of the electrical heating device. Whereas previously the housing containing and holding the heating block has in each case been adapted especially during the manufacture of motor vehicles to the size of the air conditioning housing, the intention of the present invention is to create the possibility of installing existing electrical heating devices with given outer dimensions of the housing into ill-fitting flow channels without having to dispense with the flow conditions advantageous for heating the medium (air). To achieve this, the flow resistance element protrudes outwards from the housing.

In this way the flow resistance element bridges a remaining gap between the outer dimensions of the housing of the electrical heating device and the inner wall(s) of the flow channel at the level of the electrical heating device after installation.

The flow resistance element of the electrical heating device according to the invention is manufactured as a separate component and joined to the housing of the electrical heating device. The joint can be made by clipping, welding, adhesive bonding or similar method. In any case the invention suggests a solution in which the housing and the at least one flow resistance element are initially pre-assembled and then introduced into the insertion opening. In this respect a standard component comprising the housing and the at least one flow resistance element can be introduced into the insertion opening during assembly. Thereafter, the required flow conditions are provided in the flow channel at the level of the electrical heating device.

These flow conditions can be adapted by a special embodiment of the flow resistance element. Thus, the flow resistance element can exhibit a form through which a certain flow resistance is produced at the given flow conditions in the flow housing which arises from the calculations for the optimum heat transfer between the flowing medium and the radiator element(s). The definitive embodiment of the flow resistance element can here also take account of varying pressure differences which arise due to the large number of variants. Here, the flow resistance element(s) themselves may have air passage apertures or air guiding elements, which lead to a predetermined influence on the flow in the flow channel or completely displace the clearance distance between the housing and the walls of the air conditioning device.

According to a preferred further development of the invention the flow resistance element is formed frame-shaped and has a receptacle for accommodating the housing. The flow resistance element, as a standardised component formed separately from the housing of the electrical heating device, surrounds this housing in each case at three marginal areas of the housing extending perpendicular to the air passage areas. The receptacle is here preferably formed such that the housing is only held in the receptacle with a low amount of play.

Preferably the receptacle forms a sliding guide for the housing. This means that the receptacle normally has retaining lugs which protrude beyond the air passage areas on the outer side and which limit the movement of the housing perpendicular to the air passage areas. The housing is thus held in this direction with little play within the receptacle. The sliding guide here preferably has an extension corresponding to the insertion direction of the electrical heating device into the insertion opening of the air conditioning housing.

Taking into consideration a particularly simple manufacture of the flow resistance element in the course of injection moulding, according to a preferred further development of the present invention it is suggested that the guide is formed with oppositely situated retaining lugs which accommodate the housing between them and which are provided offset to one another. The retaining lugs can, for example, be provided mutually offset in the insertion direction. An offset arrangement of the retaining lugs particularly implies that in a plan view on the flow resistance element the retaining lugs situated on one side of one of the air passage areas do not cover the retaining lugs interacting with the other air passage area of the housing. With this embodiment movable tool parts, such as movable cores, can be dispensed with during the injection moulding of the flow resistance element. When forming the retaining lugs mould nest parts can be alternately provided protruding over the partition plane of the injection moulding tool. The injection moulded flow resistance element can be removed from the mould nest in one part.

According to a preferred further development of the present invention the receptacle in the insertion direction is provided approximately with the extension of the housing in the insertion direction. Accordingly, the flow resistance element and the housing terminate at about the same level. This offers the possibility of clamping the flow resistance element between a boundary wall of the air conditioning housing situated opposite the insertion opening and a flange optionally joined to the housing of the electrical heating device and mounted on the outer side of the air conditioning housing, extending transversely to the layers of the heating block. For the secure mounting of the electrical heating device together with the separately manufactured flow resistance element the housing only needs to be inserted into the receptacle. This pre-assembled unit, the parts of which in each case can slide in the insertion direction, is permanently specifically clamped between the boundary wall and the flange after introduction into the air conditioning housing. This produces a particularly simple embodiment.

Although the flow resistance element can also completely or partially displace air passage areas of the housing to adapt the flow resistance over the housing to the optimum heat transfer conditions, it is preferable if the flow resistance element is formed such that it leaves each of the air passage apertures free on the housing. The air passage apertures of the housing are here normally provided on it correspondingly, namely at those air passage apertures which are provided on the housing parallel to one another and which are subjected to the air flow to be heated approximately at right angles.

The flow resistance element preferably comprises a flow resistance ridge. This flow resistance ridge normally extends parallel to the air passage area(s). It protrudes from a longitudinal wall which forms a contact base of the flow resistance element and which extends perpendicular to the air passage areas. The housing can abut this contact base. The flow resistance ridge can here be provided as an extension in the insertion direction. The flow resistance ridge can also however extend perpendicular to this. Here, as a flow resistance ridge particularly a wall-shaped embodiment is designated which is formed approximately centrally on the flow resistance element in the thickness direction, i.e. approximately centrally between the two air passage areas of the housing. In this way material and also weight can be saved during the manufacture of the flow resistance element. For reinforcing the flow resistance elements and for supporting the electrical heating device in the flow channel it is preferable if the flow resistance ridge(s) are supported by supporting ridges extending essentially perpendicular to the air passage areas. These supporting ridges normally protrude from the longitudinal wall of the flow resistance element which forms the contact base for the housing. The supporting ridges can, for example, have a triangular base area so that the gusset between the longitudinal wall and the free end of the flow resistance ridge is filled by the triangular supporting ridge.

According to a preferred further development of the present invention the flow resistance ridge has a plurality of consecutive ridge apertures in the longitudinal direction of the flow resistance ridge. The supporting ridges are normally joined between neighbouring ridge apertures. Through the ridge apertures the flow resistance and the flow behavior can be influenced by the flow resistance element.

In accordance with another aspect of the invention, a motor-vehicle air conditioning device has an air conditioning housing defining a flow channel with a boundary wall situated opposite to an insertion opening for a motor-vehicle auxiliary heating device. The heating device includes a layered heating block comprising at least one PTC heating element and a radiator element abutting it, which is held in a housing formed with oppositely situated air passage areas with air passage apertures formed in them. The flow channel is larger at the level of the motor-vehicle auxiliary heating device than the housing. A frame-shaped flow resistance element arranged at the level of the motor-vehicle auxiliary heating device and between the housing and the wall(s) of the air conditioning housing. The flow resistance element is manufactured as a component independent of the housing differs from the prior state of the art in that the flow channel is larger at the level of the motor-vehicle auxiliary heating than the housing of same and that at the level of the motor-vehicle auxiliary heating between the flow channel and the motor-vehicle auxiliary heating at least one flow resistance element is provided which is manufactured as a component independent of the housing and bridges the clearance distance between the housing and the wall(s) of the air conditioning housing.

BRIEF DESCRIPTION OF THE DRAWINGS

The invention is explained in more detail below with reference to the description. This shows the following.

DETAILED DESCRIPTION OF THE PREFERRED EMBODIMENT

Figure 1:
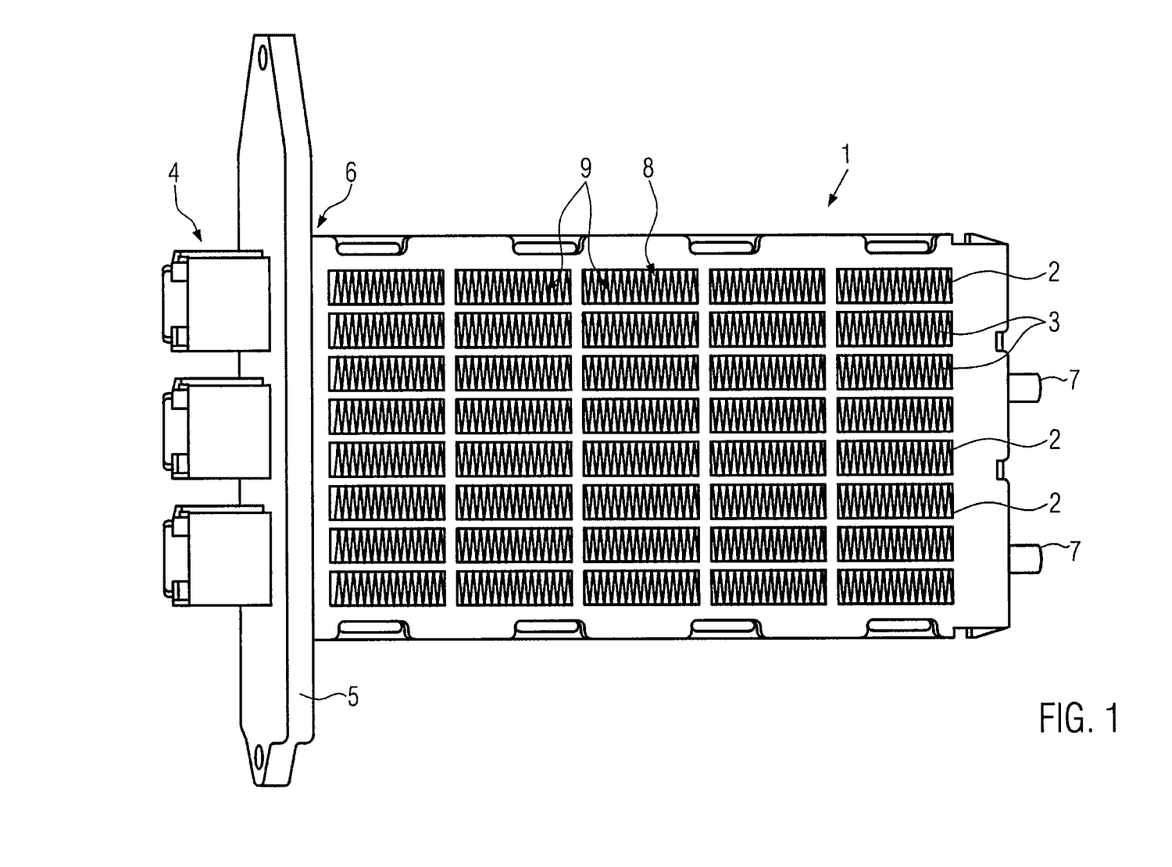
FIG. 1 a slightly perspective side view of an electrical heating device as motor-vehicle auxiliary heating.

The embodiment of a motor-vehicle auxiliary heating system shown in FIG. 1 comprises a two-part housing 1 with two essentially identically formed housing halves which are clipped together. This housing 1 comprises a heating block consisting of a plurality of PTC heating elements 2 and abutting radiator elements 3. This heating block is normally held under the tension of a spring in the housing 1. The housing 1 is formed essentially frame-shaped and on one connecting side 6 has selected sheet metal bands of individual PTC heating elements 2 protruding over it which form electrical contact lugs on this outer side. They are surrounded by a plug housing 4 which is formed as one part with a flange 5 by means of injection moulding. On the sides of this flange 5 the housing 1 then forms a connecting side 6. On the side oppositely situated to the connecting side 6 mounting pins 7 protrude beyond the housing 1. These mounting pins 7 can be introduced into the mounting apertures which are formed on an air conditioning housing which is not illustrated. After introducing the mounting pins 7 into the corresponding mounting apertures, the housing 1 is fixed opposite the air conditioning housing. The mounting pins 7 can be formed on the housing 1 by means of injection moulding or locked or joined by clipping the two housing halves with the plastic housing 1.

Figure 2:
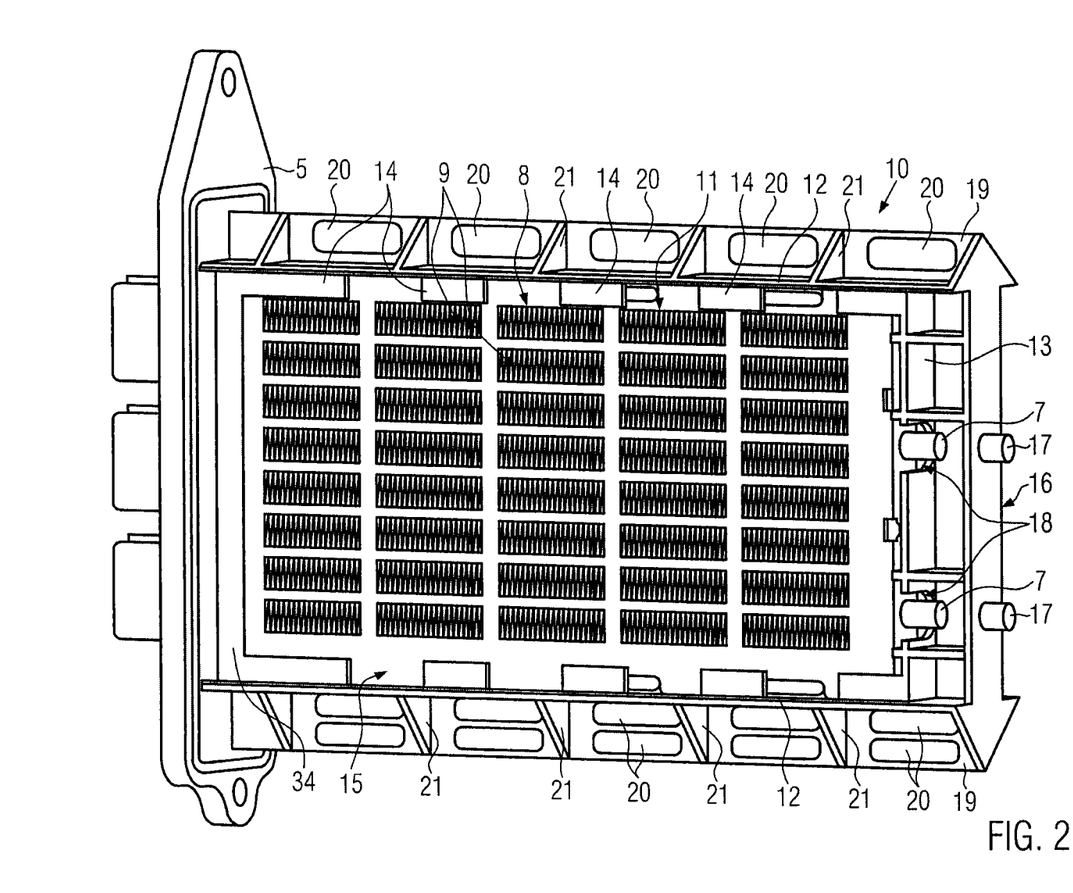
FIG. 2 the embodiment of a motor-vehicle auxiliary heating system shown in FIG. 1 with a frame-shaped flow resistance element.

FIG. 2 shows an embodiment of a frame-shaped flow resistance element 10. This frame-shaped flow resistance element 10 forms two oppositely situated frame openings 11 which on the housing 1 leave free air passage apertures 9 on oppositely situated air passage areas 8 of the housing 1. The frame-shaped flow resistance element 10 forms two oppositely situated longitudinal walls 12 as well as an end wall 13 bridging these two longitudinal walls 12. The sizes of the longitudinal walls 12 and the end wall 13 correspond approximately to the thickness of the housing 1. The distance of the longitudinal walls 12 corresponds approximately to the width of the housing 1. On the inner side the longitudinal walls 12 have retaining lugs 14 protruding over them, which are assigned to the air passage areas 8 of the housing 1 and limit the transverse movement of the housing 1 within the sliding receptacle 15. The spacing of oppositely situated retaining lugs 14 corresponds approximately to the width of the housing 1.

With the illustrated embodiment there is no connection between the flow resistance element 10 and the flange 5. However, it is quite conceivable that the flow resistance element 10 latches with the flange 5 so that one constructional unit is formed, consisting of the flange 5, the housing 1 and the flow resistance element 10.

Adjacent to the end wall 13, the flow resistance element 10 forms a lattice-type supporting structure. A mounting side 16 of the flow resistance element 10 oppositely situated to the connection side 6 has the pin elements 17 protruding beyond it, which are, for example, formed by means of injection moulding during the manufacture of the flow resistance element 10. Corresponding to the position of the pin elements 7, the end wall 13 has recesses 18, which are formed such that the mounting pins 7 of the housing 1 fit into these recesses 18.

On their outer side, oppositely situated to the sliding receptacle 15, the longitudinal walls 12 have flow resistance ridges 19 protruding beyond them, which are formed approximately centrally in the thickness direction on the flow resistance element 10. The flow resistance ridges 19 have ridge apertures 20 provided consecutively in the longitudinal direction of the ridges 19. Between adjacent ridge apertures 20, supporting ridges 21 are formed which extend in a gusset between the flow resistance ridge 19 and the outer side of the longitudinal walls 12 and stiffen the flow resistance ridges 19. The upper flow resistance ridge 19 in FIG. 2 has a row of ridge apertures 20; the lower flow resistance ridge 19 extending parallel to this has two rows of ridge apertures 20.

Figure 3:
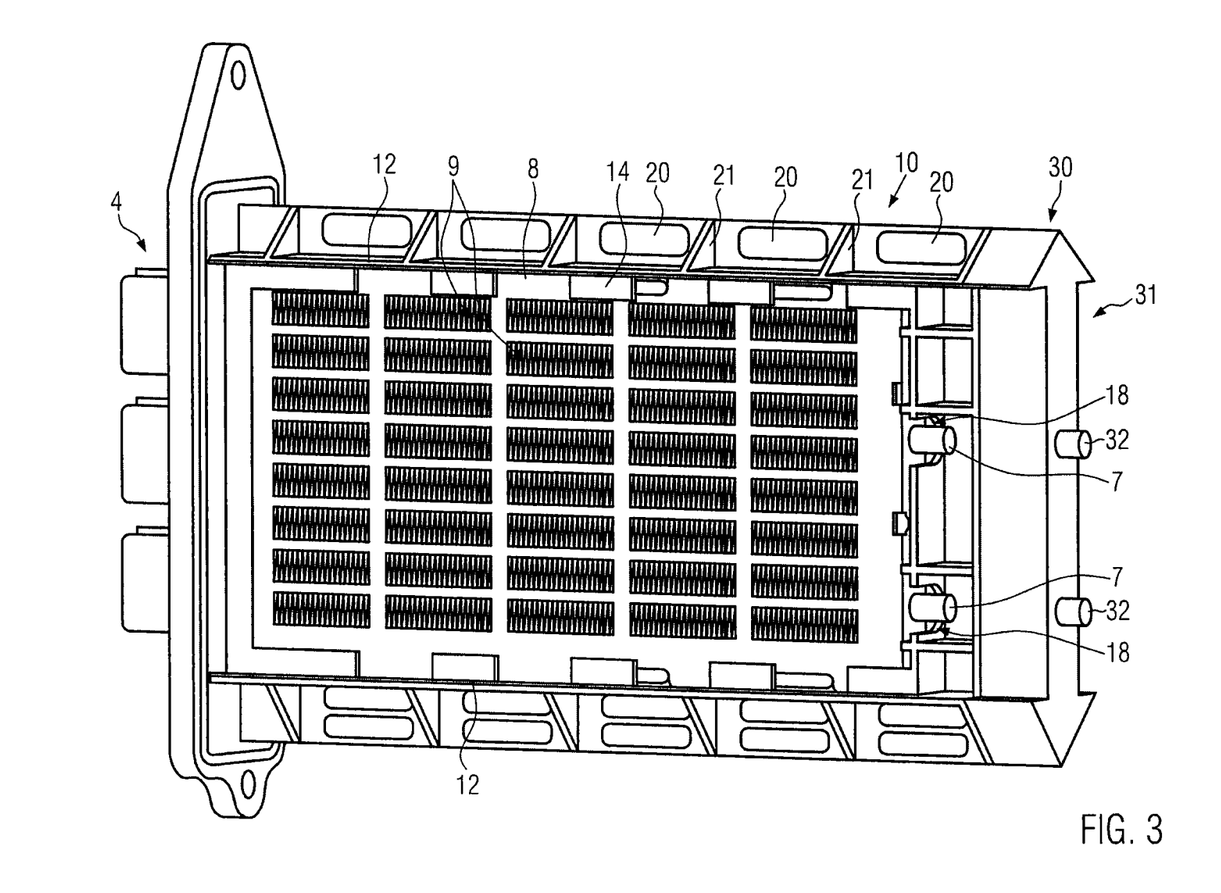
FIG. 3 a slightly perspective side view of the embodiment shown in FIG. 2 with a further embodiment of a flow resistance element connected on the face side.

FIG. 3 illustrates a further embodiment of a flow resistance element, which is formed as an end-wall flow resistance element 30. The end-wall flow resistance element 30 is formed as a full element, i.e. it has no flow passage apertures. The end-wall flow resistance element 30 has receptacle openings, which are not illustrated here and which are formed to fit the outer diameter of the pin elements 17, so that the end-wall flow resistance element 30 is plugged onto these pin elements 17 and fixed there. The end-wall flow resistance element 30 accommodates with its cross-section the cross-sectional shape on the mounting side 16 of the frame-shaped flow resistance element 10. On its mounting side 31, the end-wall flow resistance element 30 has two pin elements 32 protruding beyond it. These pin elements 32 fit into mounting apertures, which are formed in the air conditioning housing of a motor-vehicle air conditioning device, namely at the level of the insertion opening of the motor-vehicle auxiliary heating.

Figure 4:
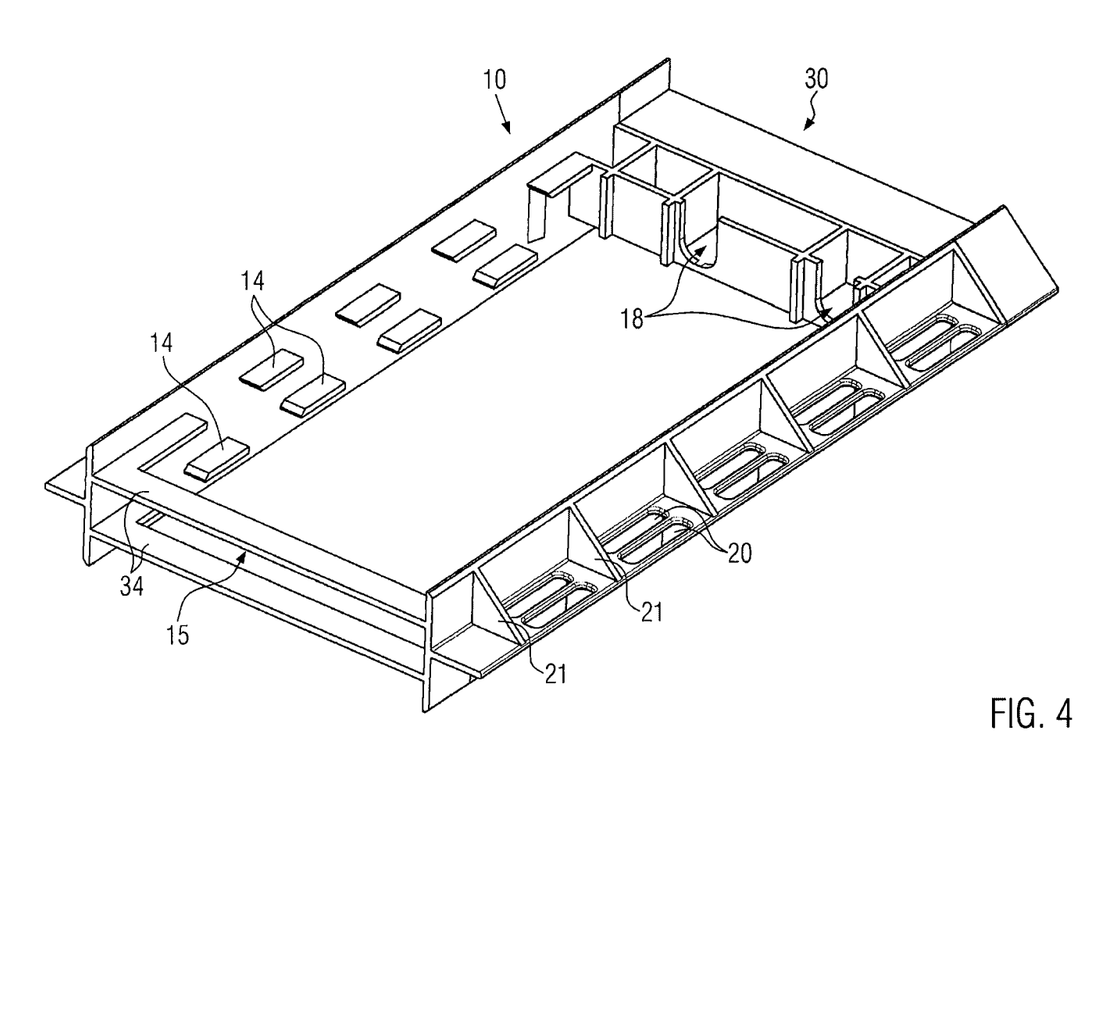
FIG. 4 a perspective side view of the embodiment shown in FIG. 3 of the frame-shaped flow resistance element without the built-in motor-vehicle auxiliary heating.
Figure 5:
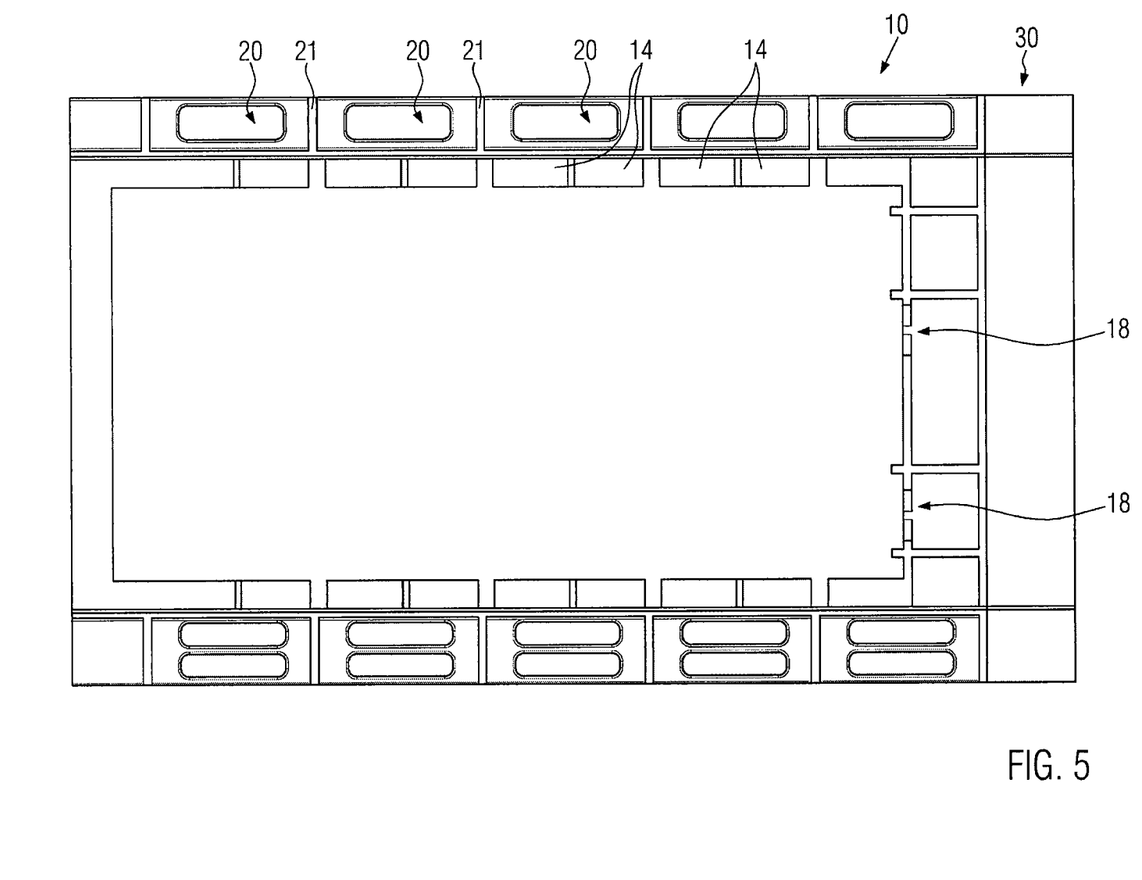
FIG. 5 the embodiment shown in FIG. 4 in a plan view.

As can be seen particularly in FIGS. 4 and 5, the retaining lugs 14 are provided offset with respect to one another. In the plan view of the housing 1 the retaining lugs 14, provided on oppositely situated frame openings 11 and delimiting the housing 1, do not overlap (cf. FIG. 5). Insertion of the auxiliary heating system illustrated in FIG. 1 into the sliding receptacle 15 occurs through a sliding aperture which is formed by connecting ridges 34 bridging two oppositely situated longitudinal walls 12 of the frame-shaped flow resistance element 10. The face-side ends of the connecting ridges 34 here form a limit stop for the flange.

A guide for insertion of the housing 1 into the flow resistance element is formed by the sliding receptacle 15. The depth of this guide, i.e. the distance between the end wall 13 and the free end of the flow resistance element 10 abutting the flange 5, corresponds approximately to the size of the housing 1 in the longitudinal direction, i.e. in the insertion direction.

The embodiments of flow resistance elements 10, 30 shown in FIGS. 1 to 5 illustrate that the auxiliary heating shown in FIG. 1 can be introduced into variously large flow cross-sections in an air conditioning housing without significant proportions of the air flow to be heated being able to flow past the housing 1 of the auxiliary heating. The embodiment of FIGS. 2 and 3 can be inserted into an air conditioning housing which is larger than the housing 1 of the auxiliary heating in the insertion direction of the auxiliary heating and also transversely to it. The end-wall flow resistance element 30 bridges a larger extension of the air conditioning housing in the insertion direction of the auxiliary heating.

Figure 6:
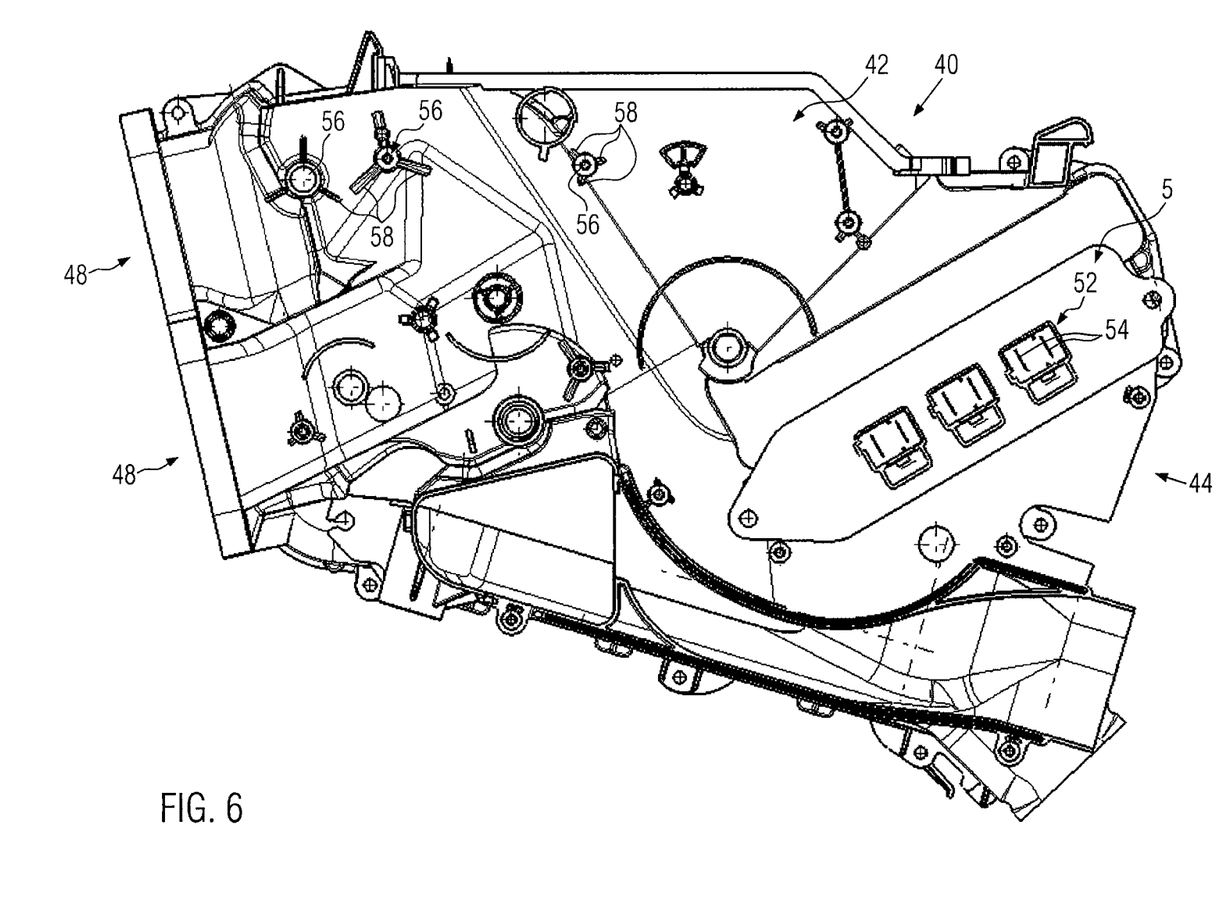
FIG. 6 a side view of an embodiment of a motor-vehicle air conditioning device.
Figure 7:
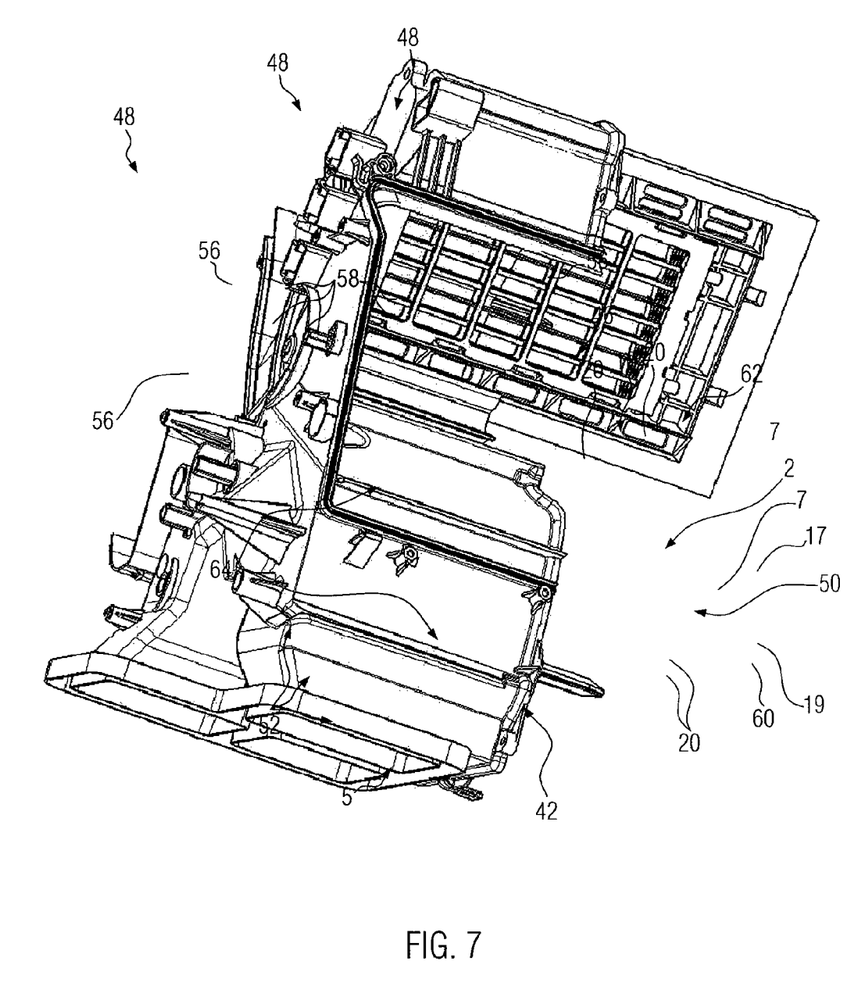
FIG. 7 the embodiment illustrated in FIG. 6 in a perspective plan view with wall parts partially cut away.

FIGS. 6 and 7 illustrate an embodiment of a motor-vehicle air conditioning device which is identified with the reference numeral 40 and has an air conditioning housing 42. The air conditioning housing 42 forms an air intake opening 44 to an air conditioning space 46. The air conditioning space 46 normally accommodates a heat exchanger, which guides heated coolant to the engine cooling system and emits the heat contained therein to the air flowing through the heat exchanger. Furthermore, an evaporator is normally provided in the air conditioning space 46 for cooling the air. The air conditioning space 46 is divided up evenly by one or a plurality of air flaps through which the air flow within the air conditioning space is divided and guided alternatively into different sections of the air conditioning space 46 for heating or cooling of air. Following the air conditioning space 46 ventilation flaps are arranged which, depending on the vehicle occupants' choice, can guide the conditioned air into certain sections of the vehicle interior, for example against the windscreen for de-icing or into the foot well or centrally out of the instrument panel. The air passage apertures provided for this on the air conditioning housing 42 are identified with the reference numeral 48.

In FIG. 7 the sole functional part accommodated in the air conditioning space 46 is the previously described electrical heating device which is identified in these figures with the reference numeral 50. In FIG. 6 relating to this motor-vehicle auxiliary heating system 50 the flange 5 and the connector sockets 52 protruding outwards from the flange 5 with the electrical plug elements 54 can be seen, which are normally formed by sheet metal bands of the PTC heating element 2, which are brought out via the outer side of the housing 1.

As can be seen in particular from FIG. 7, the air conditioning housing 42 has a plurality of mounting sleeves 56 on its outer side which are joined to the outer wall of the air conditioning housing 42 by supporting ribs 58. Inside the air conditioning space 46, the walls of which are partially omitted in the illustration given in FIG. 7, only the motor-vehicle auxiliary heating system 50 is illustrated. Here, the same components as in the previously described FIGS. 1 to 5 are identified with the same reference numerals. FIG. 7 shows definitively the embodiment of a motor-vehicle auxiliary heating system 50 illustrated in FIG. 2 and arranged in the air conditioning space 46. The air conditioning housing 42 forms a mounting frame 60, the inner surfaces of which enclose an accommodation space 62 for the motor-vehicle auxiliary heating system 50, which is larger than the circumference of the housing 1 of the embodiment of a motor-vehicle auxiliary heating system 50 illustrated in FIG. 1 and the walls 63 of which border the flow channel for heating the air at the level of the motor-vehicle auxiliary heating system 50. Accordingly, with the embodiment of a motor-vehicle air conditioning device 40 illustrated in FIGS. 6 and 7 the motor-vehicle auxiliary heating system 50 is installed into the air conditioning housing 42 together with the frame-shaped flow resistance element 10 illustrated in FIG. 2. Its outer contour is designed such that the motor-vehicle auxiliary heating system 50 essentially extends in this form up to the edges of the accommodation space 42.

Normally, the heat exchanger is located upstream of the motor-vehicle auxiliary heating system 50 in the flow direction of the air to be conditioned. In relation to this, in FIG. 7 contact bases formed by the air conditioning housing 42 are indicated, the said contact bases having the reference numeral 64.

What is claimed is:

1. An electrical motor-vehicle auxiliary heating device for assembly in a flow channel provided with an insertion opening, the motor-vehicle auxiliary heating device comprising:
   a layered heating block comprising at least one PTC heating element and at least one radiator element abutting thereto, which heating block is held in a housing forming oppositely situated air passage areas with formed air passage apertures, and
   a frame-shaped flow resistance element providing a receptacle for the housing and impeding air within the flow channel from flowing past the housing, wherein the flow resistance element is formed as a sliding guide for the housing, and wherein the sliding guide is adapted to accommodate sliding movement of the housing in a longitudinal direction thereof,
   wherein the housing is accommodated in the flow resistance element as a component that is independent of the flow resistance element.

2. An electrical heating device according to claim 1, wherein the motor-vehicle auxiliary heating device is insertable into through the insertion opening.

3. An electrical heating device according to claim 1, wherein the flow resistance element is made of plastic.

4. An electrical heating device according to claim 1, wherein the sliding guide has oppositely situated retaining lugs which accommodate the housing between them and which are provided offset to one another.

5. An electrical heating device according to claim 1, wherein an air passage aperture is formed in the housing, and wherein the flow resistance element leaves the air passage aperture free.

6. An electrical heating device according to claim 1, wherein the flow resistance element comprises a flow resistance ridge which extends essentially parallel to the air passage areas outside of a contact base of the flow resistance element and which can abut an outer area of the housing extending perpendicular to the air passage areas.

7. An electrical heating device according to claim 6, wherein the flow resistance ridge is supported by supporting ridges extending essentially perpendicular to the air passage areas.

8. An electrical heating device according to claim 6, wherein the flow resistance ridge is penetrated by a plurality of ridge apertures formed consecutively in the longitudinal direction of the flow resistance ridge.

9. An electrical heating device according to claim 1, wherein the housing has a flange which extends transversely to the layers of the heating block and which abuts the flow resistance element.

10. An electrical heating device according to claim 1, wherein the housing forms a connecting side, on which electrical connecting elements of the heating block are exposed, as well as a mounting side oppositely situated to the connecting side, on which mounting pins arranged on the housing are exposed, and wherein the flow resistance element has recesses on its outer surface for accommodating the mounting pins and on its outer surface, and wherein pin elements protrude beyond the mounting side of the housing and can be introduced into mounting apertures on an air conditioning housing of a vehicle.

11. An electrical heating device according to claim 1, wherein the frame-shaped flow resistance element is formed in one piece.

12. An electrical heating device as in claim 1, further comprising a second flow resistance element formed on the mounting side of the frame-shaped flow resistance element with the same width as the frame-shaped flow resistance element, wherein the second flow resistance element has receptacle openings for pin elements provided on the outer surface of the frame-shaped flow resistance element, and has further pin elements protruding beyond it which can be introduced into mounting apertures formed on an air conditioning housing of a vehicle.

13. A motor-vehicle air conditioning device comprising:
   an air conditioning housing having at least one wall defining a flow channel with a boundary wall situated opposite to an insertion opening,
   a motor-vehicle auxiliary heating device inserted into the insertion opening and including a layered heating block comprising at least one PTC heating element and a radiator element abutting it, wherein the heating device is held in a housing formed with oppositely situated air passage areas with air passage apertures formed in them, wherein the flow channel is larger at a level of the motor-vehicle auxiliary heating device than at the housing
   a frame-shaped flow resistance element arranged at the level of the motor-vehicle auxiliary heating device and located between the housing and the wall of the air conditioning housing, wherein the flow resistance element is manufactured as a component that is independent of the housing and that is made of plastic.

14. A motor-vehicle air conditioning device according to claim 13, comprising at least one flow resistance element as in claim 1.

15. An electrical motor-vehicle auxiliary heating device for assembly in a flow channel provided with an insertion opening, the motor-vehicle auxiliary heating device comprising:
   a layered heating block comprising at least one PTC heating element and at least one radiator element abutting thereto, the heating block being held in a housing forming oppositely situated air passage areas with formed air passage apertures, and a frame-shaped flow resistance element providing a receptacle for the housing and formed as a sliding guide for the housing;

wherein the housing is accommodated in the flow resistance element as a component that is independent of the flow resistance element, and wherein the sliding guide has retaining lugs which are situated oppositely one another and which accommodate the housing between them and which are provided offset to one another.

16. The motor-vehicle auxiliary heating device of claim 15, wherein the motor-vehicle auxiliary heating device is insertable into through the insertion opening.

17. The motor-vehicle auxiliary heating device of claim 15, wherein the flow resistance element comprises a flow resistance ridge which extends essentially parallel to the air passage areas outside of a contact base of the flow resistance element and which can abut an outer area of the housing extending perpendicular to the air passage areas.

* * * * *